US009032081B1

(12) United States Patent
North et al.

(10) Patent No.: US 9,032,081 B1
(45) Date of Patent: May 12, 2015

(54) SYSTEM AND METHOD FOR LOAD BALANCING CLOUD-BASED ACCELERATED TRANSFER SERVERS

(71) Applicant: Signiant, Inc., Burlington, MA (US)

(72) Inventors: David North, Orleans (CA); Anthony Vasile, Ottawa (CA)

(73) Assignee: Signiant, Inc., Burlington, MA (US)

( * ) Notice: Subject to any disclaimer, the term of this patent is extended or adjusted under 35 U.S.C. 154(b) by 0 days.

(21) Appl. No.: 14/290,128

(22) Filed: May 29, 2014

(51) Int. Cl.
*G06F 15/173* (2006.01)
*H04L 29/08* (2006.01)

(52) U.S. Cl.
CPC ......... *H04L 67/1004* (2013.01); *H04L 67/1006* (2013.01)

(58) Field of Classification Search
CPC . G06F 9/45533; G06F 9/5083; G06F 9/5077; G06F 9/50; G06F 9/5027; F06F 11/3409; H04L 67/02; H04L 63/10; H04L 67/322
USPC .......................................... 709/227, 225–226
See application file for complete search history.

(56) References Cited

U.S. PATENT DOCUMENTS

| | | | |
|---|---|---|---|
| 6,078,960 A | 6/2000 | Ballard | 709/229 |
| 8,201,219 B2 | 6/2012 | Jones | 726/3 |
| 8,351,329 B2 | 1/2013 | Pignataro et al. | 370/230 |
| 8,650,298 B2 * | 2/2014 | Daly et al. | 709/226 |
| 8,705,513 B2 * | 4/2014 | Van Der Merwe et al. | 370/351 |
| 2003/0149755 A1 | 8/2003 | Sadot | 709/223 |
| 2011/0252137 A1 | 10/2011 | Stienhans et al. | 709/224 |
| 2012/0278440 A1 | 11/2012 | Iyer | 709/219 |
| 2013/0297769 A1 * | 11/2013 | Chang et al. | 709/224 |
| 2014/0101226 A1 * | 4/2014 | Khandekar et al. | 709/203 |
| 2014/0189109 A1 * | 7/2014 | Jang | 709/224 |
| 2014/0229608 A1 * | 8/2014 | Bauer et al. | 709/224 |

* cited by examiner

*Primary Examiner* — Duyen Doan
(74) *Attorney, Agent, or Firm* — Pillsbury Winthrop Shaw Pittman LLP

(57) ABSTRACT

The invention relates to systems and methods for load balancing cloud-based accelerated transfer servers. The system may transfer target data from client computer systems into and/or out of cloud storage. The system may allocate a set of transfer server instances and provide a client computer system with a publicly available address of each of the allocated transfer server instances. The client computer system may transmit the target data to an allocated transfer server instance via the publicly available address using an accelerated network protocol that uses a connectionless network protocol. The allocated transfer server instance may cause the target data to be stored in cloud storage, such as a cloud object storage provided by a cloud service provider. A given transfer server instance may be integrated with the cloud service provider and have a local, low latency, connection to storage devices of the cloud service provider.

30 Claims, 6 Drawing Sheets

SYSTEM AND METHOD FOR LOAD BALANCING CLOUD-BASED ACCELERATED TRANSFER SERVERS

FIELD OF THE INVENTION

The invention relates to a system and method for load balancing cloud-based accelerated transfer servers.

BACKGROUND OF THE INVENTION

A number of cloud service providers offer online (e.g., networked) remote storage. For example, AMAZON offers its Amazon S3™ storage service, MICROSOFT offers its MICROSOFT AZURE Storage service, GOOGLE offers its GOOGLE CLOUD STORAGE service, and others offer similar services. In exchange for a fee, cloud service providers allow their customers to upload and retrieve data from online remote storage.

Uploading large quantities of data to remote storage, such as those offered by cloud service providers, may be inefficient and difficult to manage. For example, cloud service providers typically employ conventional protocols (e.g., TCP and HTTP) that experience degraded network throughput in the presence of underlying network bottlenecks. Such network bottlenecks may include network latency, errors (e.g., dropped packets) and/or other network bottlenecks that may occur when transferring data to cloud storage over a diverse network, such as the Internet. Accelerated data transfer utilize new protocols to overcome these limitations, however these protocols do not interact well with traditional cloud load balancing mechanisms designed for managing HTTP and TCP sessions and simple UDP interactions.

These and other drawbacks exist.

SUMMARY OF THE INVENTION

The invention addressing these and other drawbacks relates to a system and method for load balancing cloud-based accelerated transfer servers. The system may use a Software-as-a-Service ("SaaS") platform that integrates with cloud service providers to provide high transfer speed, low operational overhead, scalability, and/or other benefits that can be used to efficiently transfer target data into and/or out of cloud storage. Client computer systems may use the system to efficiently transfer their target data into and/or out of cloud storage.

To facilitate these and other functions, the system may mediate the transfer of target data from a client computer system to cloud storage by using a load-balanced set of transfer server instances executed by a cloud service provider to store the target data into cloud storage provided by the cloud service provider. Because a given transfer server instance and storage object may be hosted by the same cloud service provider (e.g., within the cloud service provider's local network or otherwise behind the cloud service provider's firewall), cross-network latency, throughput, and/or other bottlenecks associated with cross-network delays may be avoided. To minimize bottlenecks when transferring data from the client computer system to the transfer server instance, the client computer system may use an accelerated network protocol that uses connectionless packets of data, such as User Datagram Protocol ("UDP") packets, to transfer the target data.

Thus, the accelerated network protocol may run on top of a connectionless network communication protocol. Although the accelerated network protocol provides accelerated data transfers by using a connectionless protocol, the accelerated network protocol is not understood by conventional load balancers. To facilitate its use, the system may mediate the transfer by first establishing a connection with a cloud service provider using a network protocol (e.g., TCP) that is understood by conventional load balancers to request requesting an allocation of transfer server instances. Upon allocation of a transfer server instance, the system may provide an public address of the allocated transfer server instance to the client computer system, which transfers the target data via the accelerated network protocol. In an implementation, the accelerated network protocol may include a custom or proprietary network protocol that is not understood by conventional load balancers. Thus, the system may request an allocation of server instances from a given cloud service provider using a conventional protocol (e.g., TCP) that is understood by conventional load balancers. Once allocated, the system may provide a publicly available address for each allocated transfer server instance to a client computer system, which may use the publicly available address to provide the target data as connectionless data packets.

The client computer system may be provided with a lightweight agent to transmit the target data to an allocated transfer server instance via the publicly available address using the custom network protocol that uses connectionless data packets. Thus, system abstracts the interaction with cloud service providers such that the client computer system need not be programmed with dedicated software solutions that interface with cloud service providers, minimizing the need for software maintenance. In this manner (unlike conventional load balancing systems), the client computer system cooperatively participates in a load balancing process in which one or more transfer server instances are allocated and used to transfer data.

A given transfer server instance may perform one or more operations to store the target data at a cloud object storage using instructions provided by the system. In this manner, the system may integrate with cloud services to facilitate intra-network (e.g., within a given cloud service provider's network) data transfers to cloud storage. For example, the system may provide transfer server instance instructions to be run as an Amazon EC2 compute instance, which, as programmed by the transfer server instance instructions, stores (or retrieves) target data using an S3 object. Amazon EC2 compute instances and S3 storage objects are used herein for exemplary purposes only and are not intended to be limiting. For example, cloud compute instances and storage objects provided by other cloud service providers may be used as described herein as well.

Responsive to receipt of the target data, the allocated transfer server may cause the target data to be stored in cloud storage, such as a cloud object storage provided by a cloud service provider. As used herein, "cloud object storage" or "storage object" refers to remote storage and does imply storage using an object-database storage approach.

The system may integrate with various cloud service providers, which may allow client computer system (and their operators) to leverage existing storage accounts (e.g., cloud tenancies) with various cloud service providers. The client computer system may use any one of various cloud service providers that are available and is therefore not constrained to any one of the providers or storage platforms.

The system may automatically scale the allocated transfer server instances as a data transfer is occurring, before the data transfer is initiated, and/or at other times as appropriate. In this manner, the system may dynamically adjust allocations to respond to customer demand, server loads, and/or other conditions.

The system may provide robust tracking tools to store and report on various transfer information. The transfer information may include, for example, an identity of who or what initiated a target data transfer, a time/date of a transfer, a destination of the target data transfer, an identification of a transfer server instance that was allocated to handle the target data transfer, and/or other information related to the target data transfer.

Using the system, various workflows and other processes that require fast exchange of files to and/or from cloud storage, including active archiving, media processing and big data analysis, may be easily and cost-effectively implemented.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
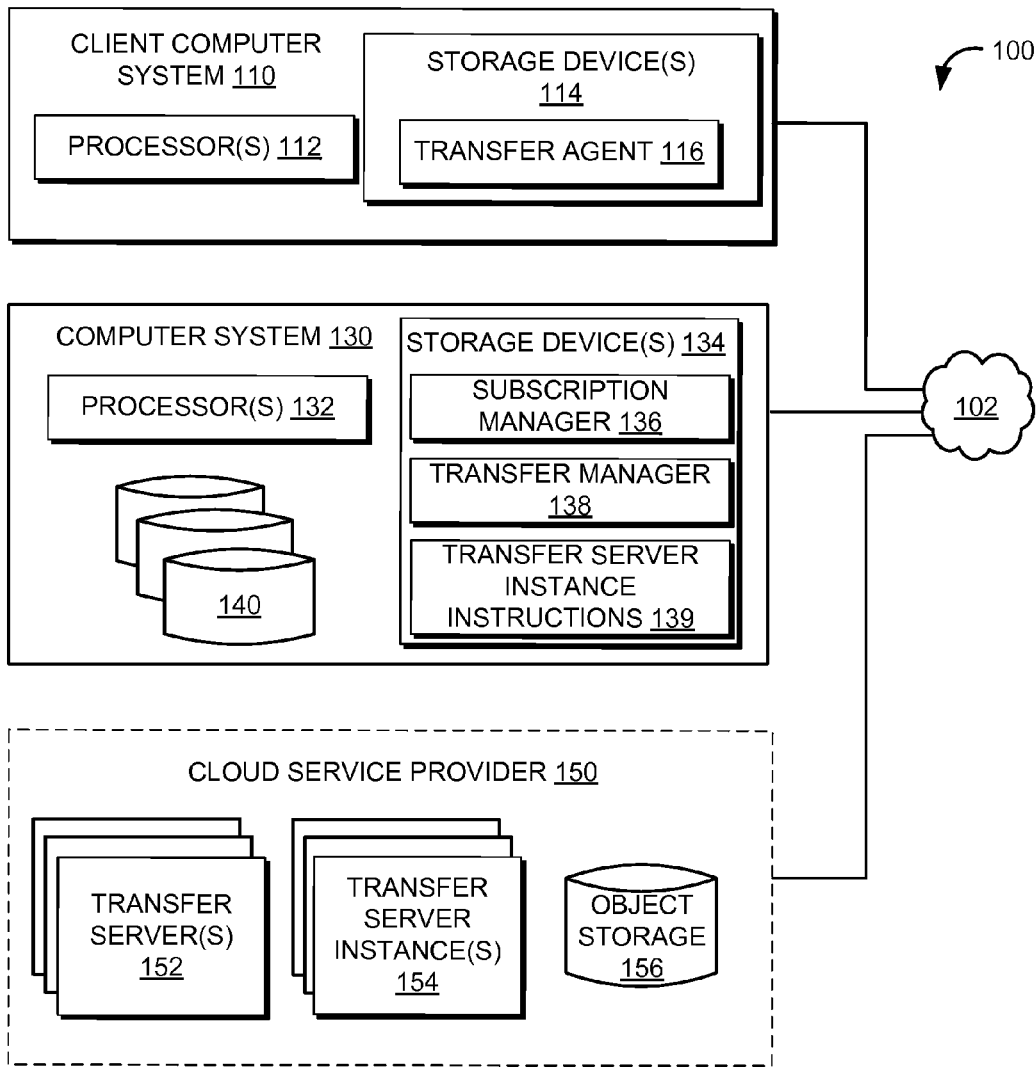
FIG. 1 illustrates a system of load balancing cloud-based accelerated transfer servers, according to an implementation of the invention.

The invention relates to a SaaS platform that provides high transfer speed, low operational overhead, scalability, and/or other benefits that can be used to efficiently transfer target data into and/or out of cloud storage.

To facilitate these and other functions, the system may mediate the transfer of target data from a client computer system to cloud storage by using a load-balanced set of transfer server instances executed by a cloud service provider to store the target data into cloud storage provided by the cloud service provider. Because a given transfer server instance and storage object may be hosted by the same cloud service provider (e.g., within the cloud service provider's local network or otherwise behind the cloud service provider's firewall), cross-network latency, throughput, and/or other bottlenecks associated with cross-network delays may be avoided. To minimize bottlenecks associated with transferring data using high-overhead network protocols (e.g., TCP) from the client computer system to the transfer server instance, the client computer system may use an accelerated network protocol that uses connectionless packets of data, such as those using a User Datagram Protocol ("UDP"), to transfer the target data. Thus, the accelerated network protocol may run on top of a connectionless network communication protocol. In this manner, data transfer rates from the client computer system to the transfer server instance are improved relative to using high-overhead communication protocols.

In an implementation, the accelerated network protocol may include a custom or proprietary network protocol that is not understood by conventional load balancers. Thus, the system may request an allocation of server instances from a given cloud service provider using a conventional protocol (e.g., TCP) that is understood by conventional load balancers. Once allocated, the system may provide a publicly available address for each allocated transfer server instance to a client computer system, which may use the publicly available address to provide the target data as connectionless data packets.

Responsive to receipt of the target data, the allocated transfer server may cause the target data to be stored in cloud storage, such as a cloud object storage provided by a cloud service provider. As used herein, "cloud object storage" refers to a data representation used to store data and does imply an object-oriented storage approach. "Cloud storage" refers to remote storage at a remote device, such as a remote device operated by a cloud service provider.

The client computer system may use any one of various cloud service providers that are available and is therefore not constrained to any one of the providers or storage platforms. The system may integrate with various cloud service providers, which may allow client computer system (and their operators) to leverage existing storage accounts with various cloud service providers.

The system may automatically scale the allocated transfer server instances as a data transfer is occurring, before the data transfer is initiated, and/or at other times as appropriate. In this manner, the system may dynamically adjust allocations to respond to customer demand, server loads, and/or other conditions.

The system may provide robust tracking tools to store and report on various transfer information. The transfer information may include, for example, an identity of who or what initiated a target data transfer, a time/date of a transfer, a destination of the target data transfer, an identification of a transfer server instance that was allocated to handle the target data transfer, and/or other information related to the target data transfer.

Exemplary System Configuration

FIG. 1 illustrates a system 100 of load balancing cloud-based accelerated transfer servers, according to an implementation of the invention. System 100 may include, without limitation, a client computer system 110, a computer system 130 that mediates the data transfer (e.g., upload and/or download), one or more databases 140, one or more cloud service providers 150, and/or other components.

Client Computer System 110

Client computer system 110 may include one or more processors 112 (also interchangeably referred to herein as processors 112, processor(s) 112, or processor 112 for convenience), one or more storage devices 114 (which may store a transfer agent 116), and/or other components. Processors 112 may be programmed by one or more computer program instructions. For example, processors 112 may be programmed by transfer agent 116 and/or other instructions. As used herein, for convenience, the various instructions will be described as performing an operation, when, in fact, the various instructions program the processors 112 (and therefore client computer system 110) to perform the operation.

Transfer agent 116 may facilitate the upload of target data for storage using cloud storage service 150. The target data may include information that the customer would like stored remotely. For example, and without limitation, the target data may include discrete files (e.g., media files, word processing files, and/or other types of files), executable files (e.g., applications), developer files (e.g., source code), and/or other information that can be uploaded for storage at a remote site such as cloud storage. The target data may include data that is locally stored at client computer system 110, remotely stored (e.g., at a content provider not illustrated in FIG. 1), and/or other location that is a source of the target data for transfer (e.g., copy to and/or from) cloud storage. The target data may be uploaded to remote storage sites other than those offered by cloud storage services 150 as well.

In an implementation, transfer agent 116 may receive a request to transfer (e.g., upload or download) target data using cloud storage. The request may be associated with various processes such as, without limitation, archiving processes, media processing, big data analysis, workflows, and/or other processes. The request may be received from a human operator, an automated computer process, command line parameters when invoked, LINUX processes, WINDOWS process, MAC OSX processes, native hot folder applications that automatically uploads new content placed in a folder to be uploaded to cloud storage, an API/SDK that integrates client functionality with third party application, a web application (e.g., Javascript), a WINDOWS Application such as C++ Native SDK, a LINUX Application such as C++ Native SDK, a Mac OSX Application such as Objective C Native SDK, an iOS Application such as Objective C Native SDK, an ANDROID Application such as NDK Native SDK, and/or other source that can request target data to be uploaded for storage and/or downloaded from storage. For example, transfer agent 116 may provide a user interface that a human operator may use to identify target data to be uploaded. Alternatively or additionally, transfer agent 116 may expose an Application Programming Interface ("API") or other set of application calls that facilitate upload requests from applications. For example, a local application may perform a "save as" operation on a file (or other target data) that causes the file to be saved to cloud storage service 150, instead of stored locally. In those instances, the application may be modified to make requests to the transfer agent 116 to facilitate uploads. In other instances, an automated data backup process may periodically cause target data to be backed up via transfer agent 116. Other types of manual, automated, or semi-automated processes may request data transfers according to particular needs, and/or uses described herein.

Responsive to the request to upload target data, transfer agent 116 may establish a communication link with computer system 130. For example, transfer agent 116 may initiate an initial handshake with computer system 130 using a first network protocol, such as, without limitation a Transmission Control Protocol ("TCP"), HyperText Transfer Protocol ("HTTP"), and/or other network protocol. Transfer agent 116 may communicate a request to upload target data.

The request may include one or more upload parameters that specify the upload and may be used by computer system 130 to allocate one or more server instances to allocate for the upload. The one or more upload parameters may include, without limitation, a size of target data, a number of server instances desired, a preferred cloud service provider to use, user credentials (e.g., user identification, password, Amazon AWS Access Key and Secret Key, Microzoft Azure Account Name and Access Key, etc.) used to access/store data to a cloud service provider, a domain name of a load balanced transfer server group, one or more object storage parameters, an object storage container, an Amazon S3 Bucket identifier, a local file system path to upload from or download to, a credentials reference that is used to associated user credentials with guest accounts), a UserID and Password or Authentication Token, a local file system path to upload from or download to, and/or other parameters used to specify an upload.

In an implementation, client computer system 110 may have pre-registered to use a cloud service provider 150 and may accordingly have a pre-registered storage account with a given cloud service provider 150. In these implementations, transfer agent 116 may obtain an identity of the cloud service provider 150 and/or an account identifier that identifies the pre-registered storage account. In an implementation, system 100 may select a cloud service provider 150 to use. In this manner, system 100 flexibly allows client computer system 110 to use its own pre-registered storage account and/or selects a given cloud service provider 150 to be used.

Transfer agent 116 may receive (from computer system 130) a transfer server specification that includes an allocation of one or more server instances. The transfer server specification may include, for example, a public address for each of the allocated server instances. Transfer agent 116 may transmit the target data to the server instance using the public address (also referred to herein interchangeably as "publicly available address" or "publicly accessible address"). For example, transfer agent 116 may transmit the target data via an accelerated network protocol. The accelerated network protocol may be different from the first network protocol. For instance, the accelerated network protocol may include a protocol that does not require an initial handshake and/or does not perform error checking. The accelerated network protocol may include an accelerated network protocol that runs on top of a connectionless protocol (e.g., the connectionless User Datagram Protocol ("UDP")). In this manner, uploads from transfer agent 116 (operating on computer system 110) may use a relatively fast, correction-less, network protocol to maximize the transfer rate.

Having described various operations of client computer system 110, attention will now be turned to various components and operations of computer system 130, which may provide load balancing capabilities in cooperation with client computer system 110 to accelerate data transfers to cloud and/or other storage solutions.

Computer System 130

Computer system 130 may include one or more processors 132 (also interchangeably referred to herein as processors 132, processor(s) 132, or processor 132 for convenience), one or more storage devices 134 (which may store a subscription manager 136, a transfer manager 138, transfer server instance instructions 139, and/or other instructions), and/or other components. Processors 132 may be programmed by one or more computer program instructions. For example, processors 132 may be programmed by a subscription manager 136, a transfer manager 138, and/or other instructions.

In an implementation, subscription manager 136 may subscribe users to use system 100. For example, a given customer may wish to upload target data to cloud storage provided by a cloud server provider 150. The customer may subscribe to use system 100 using an interface provided by subscription manager 136. During the subscription process, subscription manager 136 may obtain subscription information from the customer. The subscription information may include, without limitation, an identity of the customer (which may include an individual user, an entity such as a business entity, etc.), a type of subscription, a preferred cloud service provider 150, a pre-registered storage account that the customer has with a particular cloud service provider 150, credentials used to logon to a pre-registered storage account that the customer has with a particular cloud service provider 150 to allow the system to upload target data to or download target data from the particular cloud service provider 150 on behalf of the customer, and/or other information). The subscription information may be included in a customer profile, which may be stored in a profile database, such as database 140.

In an implementation, subscription manager 136 may offer different levels of service. For example, a customer may obtain different types of subscriptions, each with a corresponding level of service and subscription fee. A given level of service may allow for certain transfer characteristics of a data transfer such that the customer may select a given subscription based on a desired level of service. The transfer characteristics may include, without limitation, a number of uploads included with a subscription, a maximum size of data transfer included in the subscription, a transfer rate included in the subscription, and/or other transfer characteristic. Various combinations of tiers of the transfer characteristics may be offered in a given subscription. In an implementation, an a la carte subscription may be offered as well, where the customer may pay a separate fee for each data transfer.

In an implementation, subscription manager 136 may provide transfer agent 116 to client computer system 110. For example, subscription manager 136 may provide a downloadable file that includes transfer agent 116 in executable or source code form for installation at client computer system 110. Other forms of providing transfer agent 116 may be used as well, such as by providing a physical storage medium that includes transfer agent 116.

In an implementation, when a customer has subscribed and installed transfer agent 116 in client computer system 110, requests to upload or download target data may be made to computer system 130. For example, transfer manager 138 may receive a transfer request from client computer system 110. The transfer request may specify one or more transfer parameters. Transfer manager 138 may parse the transfer parameters and allocate one or more server instances to handle the data transfer. For example, the transfer parameters may specify a certain cloud service provider 150, a pre-registered cloud service account to use, a file path or other location of target data to upload, an identifier of targeted data stored in cloud storage to retrieve, a throughput, a size, and/or other parameter that can specify a data transfer. Alternatively or additionally, transfer manager 138 may obtain one or more transfer parameters from a customer profile, which may be generated from information obtained during a subscription process and stored in database 140.

Responsive to the transfer request from client computer system 110, transfer manager 138 may establish a connection using a conventional network protocol (e.g., TCP) to cloud service provider 150 (e.g., a transfer server 152 of a cloud service provider 150), which may allocate one or more server instances 154 to handle the transfer based on conventional load balancing techniques, such as round robin, virtual IP-based hardware load balancing, and/or other conventional load balancing techniques.

In an implementation, transfer manager 138 may obtain one or more publicly accessible addresses from one or more allocated server instances 154 and communicate the publicly accessible address(es) back to client computer system 110. Alternatively, transfer manager 138 may obtain a client computer address associated with client computer system 110 and provide the client computer address to one or more allocated server instances 154, which provide the one or more publicly accessible addresses) to client computer system 110. The publicly accessible addresses may utilize network address translation, direct routing, and/or other addressing technique. The one or more allocated server instances 154 may execute transfer server instance instructions 139 to transfer target data to/from storage object 156.

Client computer system 110 may transmit the target data directly to one or more allocated server instances 154 using the publicly accessible addresses to store target data to storage object 156 or may receive the target data using the using the publicly accessible addresses to download target data from storage object 156. Client computer system 110 may upload the target data to one or more allocated server instances 154 using an accelerated network protocol and the one or more publicly accessible addresses. The one or more allocated server instances 154 may receive the target data and may upload the target data to one or more cloud storage services. For example, the one or more allocated server instances 154 may upload the target data to a server operated by one or more cloud storage service providers. For data downloads, client computer system 110 may contact the one or more allocated server instances 154 at the one or more publicly accessible addresses and receive the data using the accelerated network protocol.

The one or more allocated server instances 154 may provide, either in parallel or in series, the received data to cloud storage using a third data protocol, such as an HTTP protocol. For downloads to client computer system 110, the one or more allocated server instances 154 retrieve the target data from cloud storage based on an identifier provided by the client computer system 110. The one or more allocated server instances 154 may be provided by the same cloud service provider 150 that also provides storage object 156. Thus, the transfer from an allocated server instance 154 to storage object 156 may be within a network firewall or otherwise within a local network and therefore not exposed to network inefficiencies outside of the cloud service provider 150's local network, such as a LAN or other local network.

By using accelerated transfer servers 152, client computer system 110 need not directly interface with cloud storage services 150 (and therefore need not develop custom software applications for doing so). Instead, client computer system 110 may interface with accelerated transfer servers 152, which may handle the details of data transfers to cloud storage services 150. Furthermore, by using a correction-free and/or initialization-free protocol to send data packets from the client computer system 110 to the allocated server instance(s), file transfers are accelerated and the client computer system 110.

In an implementation, transfer manager 138 may monitor transfer requests and determine transfer information that describes a data transfer. The transfer information may include, without limitation, an identity of a user and/or process that requested the data transfer, a time/date of the requested data transfer, a destination of the data transfer (e.g., a cloud object storage and/or container (e.g., a storage object bucket) provided by cloud service provider 150), and/or other information related to the data transfer. Transfer manager 138 may store the transfer information in a profile database associated with a customer, such as in a database 140. In this manner, transfer manager 138 may maintain a log of data transfers, which may be provided to a customer that uses the system to make data transfers. The customer may use the log to track data transfers, identify potentially unauthorized data transfers, reconcile/confirm usage fees from the cloud service provider 150, and/or otherwise interact with the transfer information.

Cloud service providers 150 may include entities that offer various cloud storage services. For example, cloud service providers 150 may include, without limitation, an Amazon S3™ storage service, a MICROSOFT Azure Storage service, a Google Cloud Storage service, and/or other cloud storage service providers. Furthermore, cloud service providers may be added as they become available or removed if discontinued. In this manner, the system may scale to add additional cloud storage systems and evolve to no longer use obsolete or unavailable storage providers.

Mapping Target Data to (Cloud) Storage Objects 156

In an implementation, transfer manager 138 may maintain a mapping of an identity of target data to an identity of storage objects. For example, transfer manager 138 may maintain a mapping of a filename and/or filepath as stored by client computer system 110 with an identifier or attribute associated with a given storage object. For example, when a client computer system 110 uploads target data to be stored as a storage object 156, client computer system 110 may specify a filename or filepath to be uploaded. The filename and/or filepath may be stored in order to retrieve the target data from cloud storage. To retrieve target data stored as a storage object, client computer system 110 may provide a filename or filepath to retrieve the target data. When nested directories are recursively uploaded, a given directory (and its contents) may be downloaded by specifying a corresponding portion of the filepath prefix. In this manner, the system allows a user to track target data that was uploaded to cloud storage (e.g., using storage object 156) and retrieve all or a portion of the target data. The foregoing example should not be viewed as limiting. For instance, identifiers (e.g., globally unique identifiers) other than a filename or filepath may be used as well.

Using Credential Tokens to Upload or Download Content from Third Parties

In an implementation, the system may facilitate upload and download of target data by third parties on behalf of a client computer system 110. For example and without limitation, client computer system 110 may be associated with or otherwise operated by a media distribution entity that distributes streaming or downloaded media content. Other applications of the system by other entities may be used as well. The media distribution entity may have agreements with third parties (e.g., media production companies) that provide media content for distribution by the media distribution entity, which uses the system to provide accelerated data transfers. The media distribution entity may have one or more pre-registered cloud service accounts (protected using authentication credentials such as a username, password, etc.) with one or more cloud service providers to store their media files for distribution (and other target data) on the cloud.

In order to upload or download content using such pre-registered cloud service accounts, the authentication credentials may need to be provided to the cloud service provider. The system may obtain and store (e.g., in database 140) the authentication credentials from the media distribution entity associated with client computer system 110 so that when a data transfer from client computer system 110 is requested, the system may look up the authentication credentials, logon to the appropriate cloud service provider, and facilitate data transfer as described herein.

In some instances, the media distribution entity may wish to allow its third party partners to directly upload media content to storage object 156, but not provide such partners with its authentication credentials. Media distribution entity may request an authentication token for each of its partners. The system may assign an authentication token (e.g., a unique identifier or other unique token) for each of such partners, and associate the authentication token with the authentication credentials. Media distribution entity may provide its partners with their corresponding authentication token so that when a third party partner provides its authentication token to the system, the system may obtain the authentication credentials (as well as identify the party associated with authentication token) and logon to the corresponding cloud service provider to transfer data from the partners, as described herein. In this manner, the third party partner may upload (or download) target data on behalf of client computer system 110 (operated by the media distribution entity) without having access to the authentication credentials.

Although illustrated in FIG. 1 as a single component, client computer system 110 and computer system 130 may each include a plurality of individual components (e.g., computer devices) each programmed with at least some of the functions described herein. In this manner, some components of client computer system 110 and/or computer system 130 may perform some functions while other components may perform other functions, as would be appreciated. The one or more processors 112, 132 may each include one or more physical processors that are programmed by computer program instructions. The various instructions described herein are exemplary only. Other configurations and numbers of instructions may be used, so long as the processor(s) 112, 132 are programmed to perform the functions described herein.

Furthermore, it should be appreciated that although the various instructions are illustrated in FIG. 1 as being co-located within a single processing unit, in implementations in which processor(s) 112, 132 includes multiple processing units, one or more instructions may be executed remotely from the other instructions. In addition, at least some of the functions described herein with respect to processor(s) 112 may be performed by processor(s) 132, and vice versa.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 and/or processor(s) 132 may be programmed by one or more additional instructions that may perform some or all of the functionality attributed herein to one of the instructions.

The various instructions described herein may be stored in storage device 114 and/or storage device 134, either of which may comprise random access memory (RAM), read only memory (ROM), and/or other memory. The storage device may store the computer program instructions (e.g., the aforementioned instructions) to be executed by processor 112 and/or processor 132 as well as data that may be manipulated by processor 112 and/or processor 132. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, an Internet Protocol network, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 140 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2:
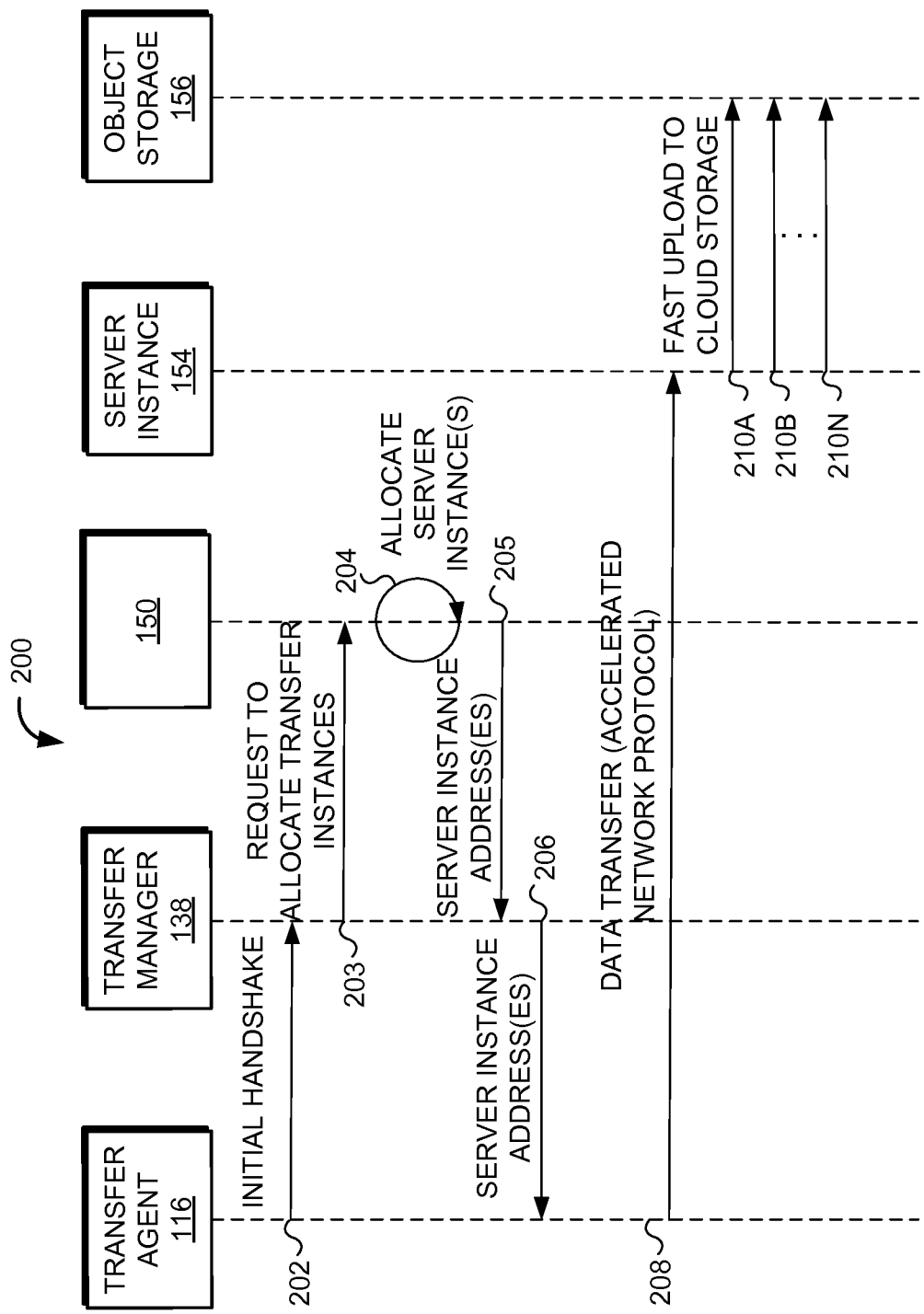
FIG. 2 illustrates a data flow diagram of load balancing cloud-based accelerated transfer servers, according to an implementation of the invention.

FIG. 2 illustrates a data flow diagram 200 of load balancing cloud-based accelerated transfer servers, according to an implementation of the invention. The various processing operations and/or data flows depicted in FIG. 2 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, transfer agent 116 may establish a first communication link with transfer manager 138 via a first network protocol. For example, agent 116 may perform an initial handshake with transfer manager 138 using a TCP or other protocol. The connection may be established in order to make a transfer request to transfer manager 138.

In an operation 203, responsive to the transfer request, transfer manager 138 may establish a connection with a cloud service provider 150 using a second network protocol that is understood by conventional load balancers used by the cloud service provider 150.

In an operation 204, the cloud service provider 150 may allocate one or more transfer server instances 154 to handle the transfer. The allocation may be based on conventional load balancing techniques that consider the load of various transfer server instances 154 that are available to handle the transfer. In an operation 205, transfer manager 138 may obtain a publicly accessible address (e.g., an IP address) of each of the allocated transfer server 154.

In an operation 206, transfer manager 138 may provide the publicly accessible address to the transfer agent 116 (e.g., via the first network connection).

In an operation 208, transfer agent 116 may establish an accelerated connection with a transfer server instance 154 using a corresponding publicly accessible address. The accelerated connection may use an accelerated network protocol that uses a connectionless network protocol. For example, and without limitation, the accelerated network protocol may run on top of (e.g., uses) a connectionless protocol, such as UDP. In this manner, the accelerated transfer protocol may use data packets that a firewall and/or other network components of a cloud service provider may recognize, but without the overhead associated with other network protocols traditionally used with and recognized by load balancers employed by cloud service providers and others.

In an operation 210, the allocated server instance 154 may receive target data, from transfer agent 116, at the publicly accessible address and transfer the target data to be stored as a storage object 156 (which may be hosted by a cloud service provider 150). Operation 210 is illustrated as operations 210A, 210B, . . . , 210N because allocated server instance 154 may transfer the target data in parallel operations, further increasing the speed of upload. In an operation, allocated server instance 154 may transfer the target data via a third network protocol, such as HTTP. It should be noted that the first, second, and third network protocols may all be the same as one another, may all be different from one another, or some be the same and others may be different, so long as an accelerated network protocol is used to transfer target data between transfer agent 116 and server instance 154. Although illustrated in FIG. 2 as a data upload, process 200 may be used for data downloads from storage object 156 as well.

Figure 3A:
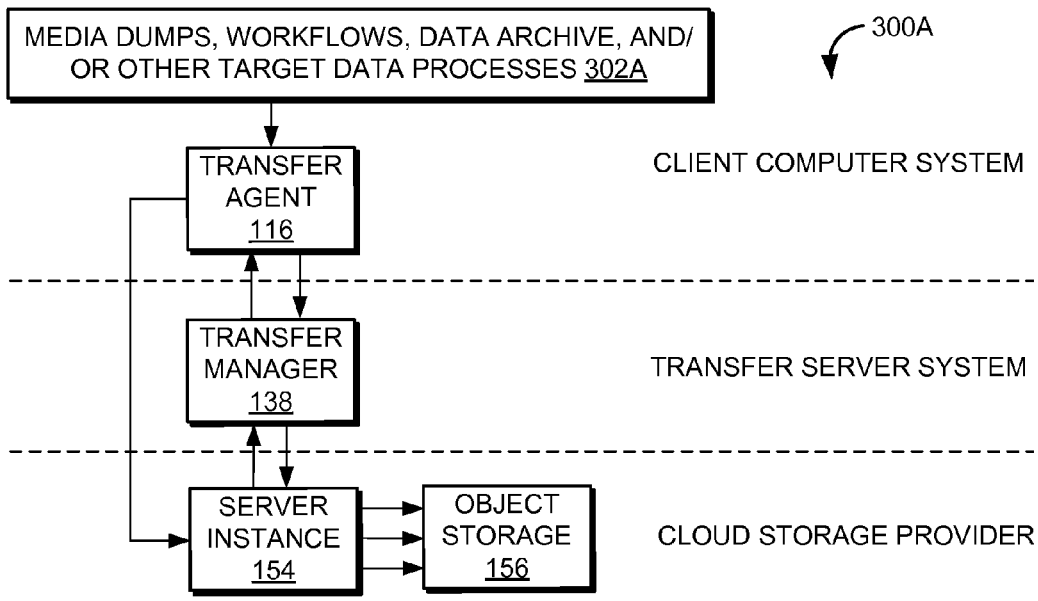
FIG. 3A illustrates a schematic diagram of client participation in load balancing cloud-based accelerated transfer servers in which a publicly accessible address is provided to a client by a transfer manager, according to an implementation of the invention.

FIG. 3A illustrates a schematic diagram 300A of client participation in load balancing cloud-based accelerated transfer servers in which a publicly accessible address is provided to a client by a transfer manager, according to an implementation of the invention.

In an implementation, one or more target data processes 302A at a client computer system (e.g., client computer system 110 illustrated in FIG. 1) may generate target data or otherwise cause target data to be stored using a storage object 156, such as a cloud object storage. A transfer agent 116 may initiate a communication link with a transfer manager 138 and request to transfer the target data. Transfer manager 138 may request or otherwise initiate an allocation of one or more transfer server instances 154 to transfer the target data and obtain a publicly accessible address for each of the allocated transfer server instances 154. Transfer manager 138 may obtain and provide a publicly accessible address to transfer agent 116, which provides the target data to an allocated transfer server instance 154 using a corresponding publicly accessible address. The allocated transfer server instance 154 may transfer the target data to a storage object 156, such as a cloud object storage.

Figure 3B:
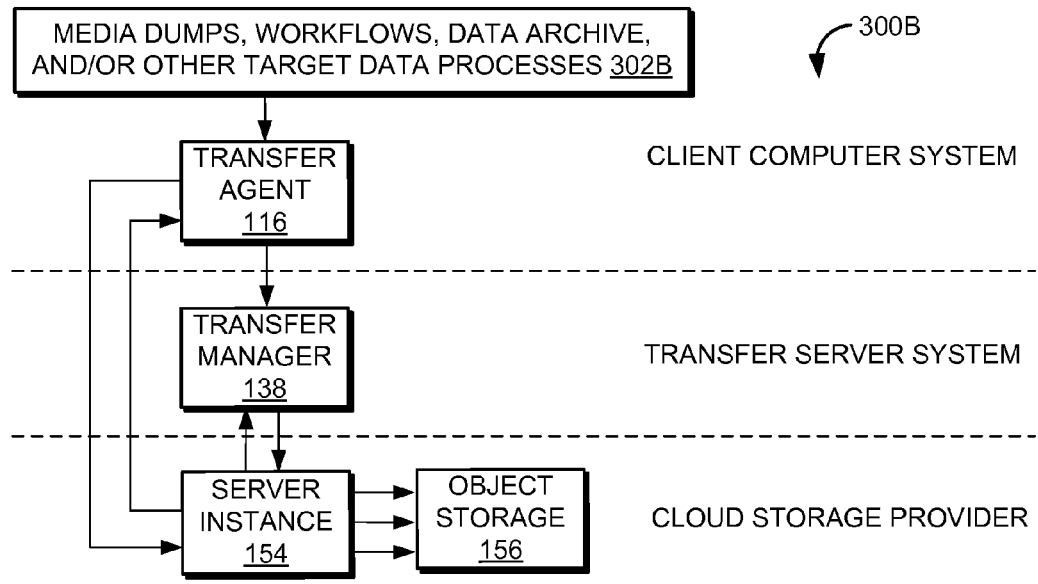
FIG. 3B illustrates a schematic diagram of client participation in load balancing cloud-based accelerated transfer servers in which a publicly accessible address is provided to a client by an allocated transfer server instance, according to an implementation of the invention.

FIG. 3B illustrates a schematic diagram 300B of client participation in load balancing cloud-based accelerated transfer servers in which a publicly accessible address is provided to a client by an allocated transfer server instance, according to an implementation of the invention.

In an implementation, one or more target data processes 302B at a client computer system (e.g., client computer system 110 illustrated in FIG. 1) may generate target data or otherwise cause target data to be stored using a storage object 156, such as a cloud object storage. A transfer agent 116 may initiate a communication link with a transfer manager 138 and request to transfer the target data. The transfer agent 116 may provide an address at which the transfer agent 116 may be contacted. Transfer manager 138 may request or otherwise initiate an allocation of one or more transfer server instances 154 to transfer the target data and provide the address where transfer agent 116 may be contacted to each of the allocated transfer server instances 154. An allocated transfer server instance 154 may provide its publicly accessible address to transfer agent 116, which uses the publicly accessible address to transfer the target data to the allocated server instance 154. The allocated transfer server instance 154 may transfer the target data to a storage object 156, such as a cloud object storage.

Referring to FIGS. 3A and 3B, in an implementation, allocated transfer server instance 154 may be integrated with a given cloud service provider, such as being locally connected to storage devices of the given cloud service provider via a Local Area Network ("WLAN"), Wireless LAN, and/or other low latency connection. In this manner, data transfer may be further accelerated.

Figure 4:
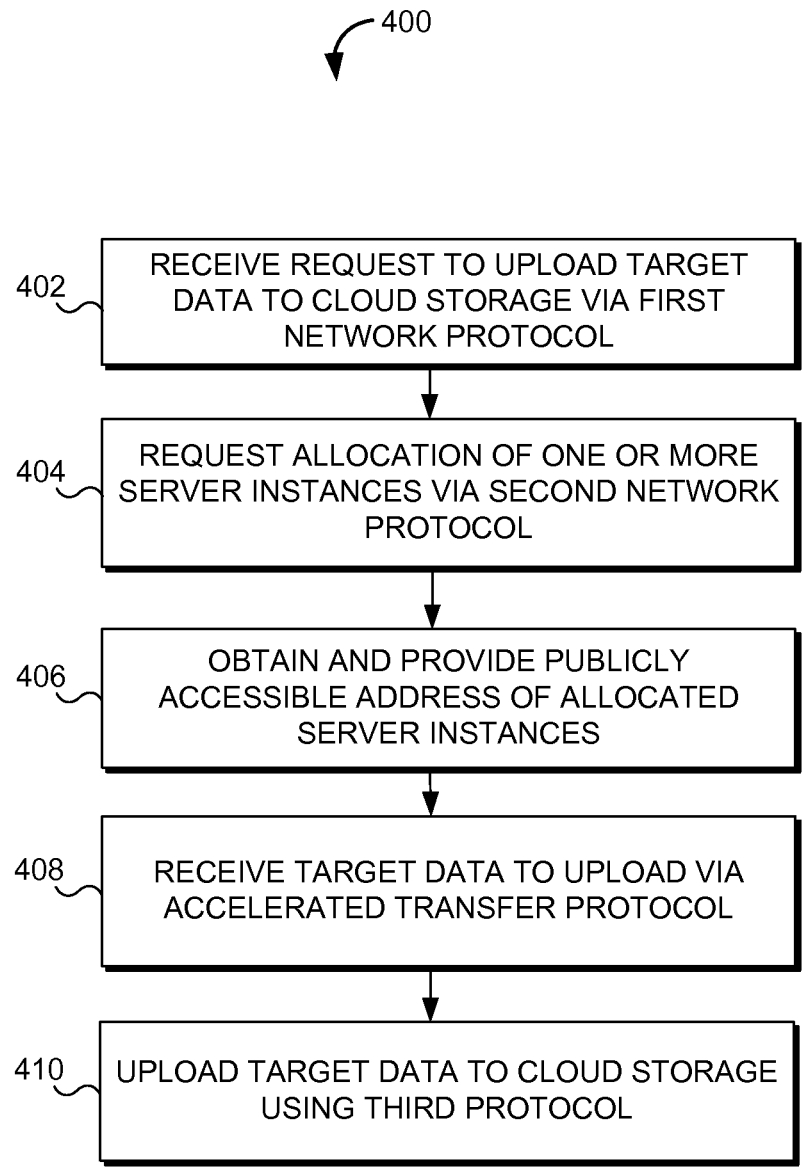
FIG. 4 illustrates a server process of load balancing cloud-based accelerated transfer servers, according to an implementation of the invention.

FIG. 4 illustrates a server process 400 of load balancing cloud-based accelerated transfer servers, according to an implementation of the invention. The various processing operations and/or data flows depicted in FIG. 4 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In operation 402, a request associated with a transfer of target data to cloud storage may be received. For example, the request may be received from a client computer system that wishes to upload target data to cloud storage provided by a cloud service provider. The request may be received over a communication link that was established from the client computer system using a first network protocol such as, for example, TCP. Other network protocols may be used as well.

In operation 404, a connection with a cloud service provider may be established to request one or more transfer server instances be allocated to transfer the target data to cloud storage. The allocation may be performed by the cloud service provider using load balancing techniques.

In operation 406, a publicly accessible address may be obtained for each of the allocated transfer server instances and provided to the client computer system.

In operation 408, the target data may be received, from the client computer system, at an allocated transfer server instance at a corresponding publicly access address. The target data may be received via an accelerated network protocol that runs on top of a connectionless network protocol such as, for example, UDP. Other connectionless network protocols may be used as well.

In operation 410, the target data may be transferred to cloud storage by the allocated transfer server instance. The transfer may be made via a third network protocol, which may be the same as or different from the first network protocol and/or the second network protocol. Although illustrated in FIG. 4 as a data upload, process 400 may be used for data downloads from a storage object as well.

Figure 5:
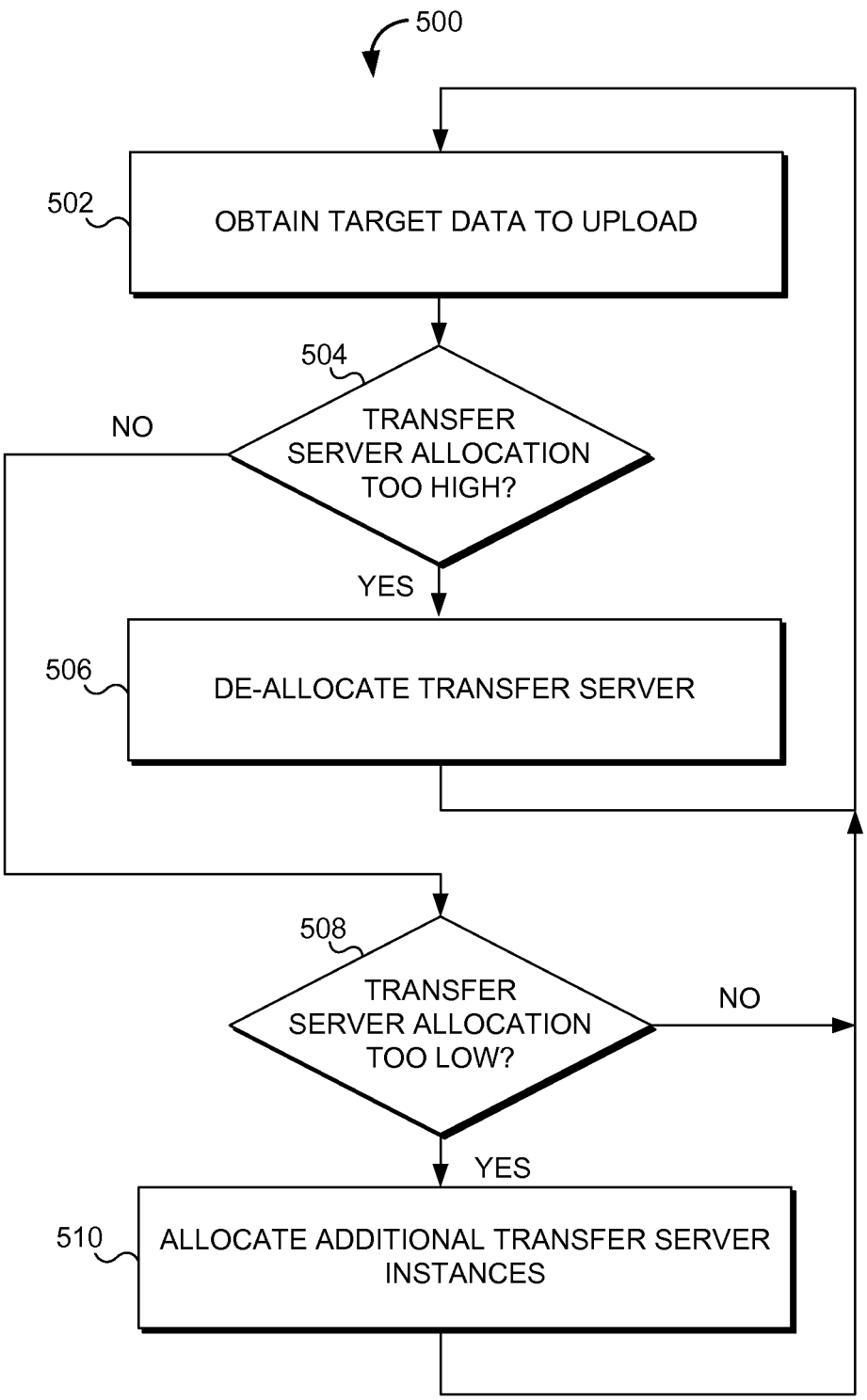
FIG. 5 illustrates a process of dynamically scaling cloud-based accelerated transfers, according to an implementation of the invention.

FIG. 5 illustrates a process 500 of dynamically scaling cloud-based accelerated transfers, according to an implementation of the invention. The various processing operations and/or data flows depicted in FIG. 5 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In operation 502, target data to upload and an indication of an allocated set of one or more transfer server instances may be obtained.

In operation 504, a determination of whether the transfer server allocation is too high may be determined. The transfer server allocation may be too high when, for example, a quantity of the target data to upload may have initially been high but has subsequently dropped down (and therefore not requiring the original allocation) and/or when transfer server loads have decreased, increasing performance of each transfer server instance (and therefore not requiring the original allocation).

In operation 506, responsive to a determination that the transfer server allocation was too high, one or more transfer server instances may be de-allocated in an operation 506. Processing may return to operation 502, where target data to transfer is obtained.

In operation 508, responsive to a determination that the transfer server allocation was not too high, a determination of whether the transfer server allocation was too low may be made. The transfer server allocation may be too low when, for example, a quantity of the target data to upload may have initially been low but has subsequently increased (and therefore requiring a greater allocation) and/or when transfer server loads have increased, decreasing performance of each transfer server instance (and therefore requiring a greater allocation).

In operation 510, responsive to a determination that the transfer server allocation was too low, one or more additional transfer server instances may be allocated. Alternatively or additionally, a first transfer server instance may replace a second (allocated) transfer server instance. For example, the first transfer server instance may be deemed to be a higher-performance transfer server instance than the second transfer server instance. The replacement may therefore result in a higher net effective allocation. The dynamic scaling of server allocations may occur during a transfer in progress and/or while a transfer server instance is being allocated.

Figure 6:
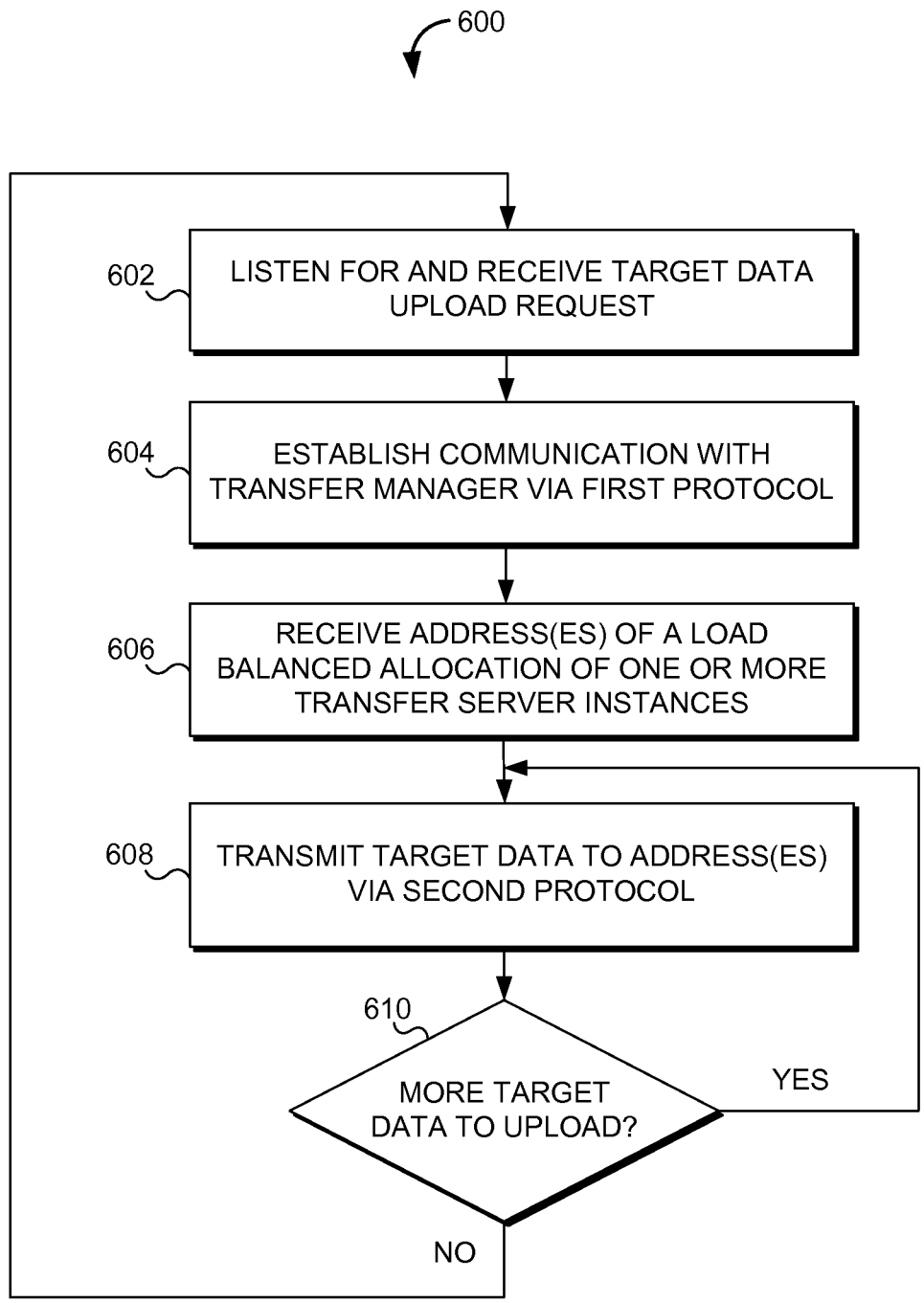
FIG. 6 illustrates a client process in load balancing cloud-based accelerated transfer servers, according to an implementation of the invention.

FIG. 6 illustrates a client process 600 in load balancing cloud-based accelerated transfer servers, according to an implementation of the invention. The various processing operations and/or data flows depicted in FIG. 6 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In operation 602, a transfer data upload request may be listened for at a client computer system. For example, one or more processes that result in target data to be uploaded to cloud storage.

In operation 604, a communication link with a transfer manager at a transfer server system may be established via a first network protocol. The transfer manager may allocate one or more transfer server instances to handle the transfer.

In operation 606, a publicly available address of an allocated transfer server instance may be received.

In operation 608, the target data may be transmitted to an allocated transfer server using the publicly available address.

In operation 610, a determination of whether more target data is to be uploaded may be made. Responsive to a determination that more target data is to be uploaded, processing may return to operation 608, where target data is transmitted. Responsive to a determination that no more target data is to be uploaded, processing may return to operation 602, where target data is listened for.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of allocating accelerated transfer servers to transfer target data between client computer systems and cloud service providers, the method being implemented in a computer system having one or more physical processors programmed with computer program instructions that, when executed by the one or more physical processors, cause the computer system to perform the method, the method comprising:
   receiving, by the computer system, a request to transfer target data to or from cloud storage from a client computer system, wherein the cloud storage is hosted by a cloud service provider;
   establishing, by the computer system, a connection with the cloud service provider responsive to the request;
   providing, by the computer system, an allocation request that requests an allocation of one or more transfer server instances to transfer the target data to or from the cloud storage;
   obtaining, by the computer system, a response to the allocation request that indicates a result of load balancing in which at least a first transfer server instance was allocated to handle the transfer;
   obtaining, by the computer system, a publicly accessible address of the first transfer server instance used to communicate with the first transfer server instance based on the obtained response; and
   providing, by the computer system, the publicly accessible address to the client computer system.

2. The method of claim 1, the method further comprising:
   receiving, by the allocated first transfer server instance, the target data from the client computer system at the publicly accessible address via an accelerated network protocol that is not understood by a load balancer used by the cloud service provider.

3. The method of claim 2, wherein the accelerated network protocol uses a connectionless network protocol.

4. The method of claim 3, wherein the allocation request is provided to the cloud service provider via a network protocol that is: (i) different from the connectionless network protocol, and (ii) is understood by the load balancer.

5. The method of claim 3, wherein the allocation request is provided via a Transmission Control Protocol, and wherein the target data is received at the allocated first transfer server instance via User Datagram Protocol data packets.

6. The method of claim 2, the method further comprising:
   uploading, by the allocated first transfer server instance, the target data to the cloud storage or downloading, by the allocated first transfer server instance, the target data from the cloud storage.

7. The method of claim 6, wherein uploading the target data to or downloading the target data from the cloud storage comprises:
   uploading or downloading the target data from within a local network.

8. The method of claim 7, wherein uploading or downloading the target data to the cloud storage comprises:
   uploading or downloading the target data via a HyperText Transfer Protocol.

9. The method of claim 1, the method further comprising:
   determining, by the computer system, whether the allocated first server instance is sufficient to transfer the target data; and
   responsive to a determination that the allocated first transfer server instance is not sufficient, requesting, by the computer system, an allocation of at least a second transfer server instance to transfer the target data.

10. A system of allocating accelerated transfer servers to transfer target data between client computer systems and cloud service providers, the system comprising:
    a computer system comprising one or more physical processors programmed with computer program instructions that when executed by the one or more physical processors, cause the computer system to:
       receive a request to transfer target data to or from cloud storage from a client computer system, wherein the cloud storage is hosted by a cloud service provider;
       establish a connection with the cloud service provider responsive to the request;
       provide an allocation request that requests an allocation of one or more transfer server instances to transfer the target data to or from the cloud storage;
       obtain a response to the allocation request that indicates a result of load balancing in which at least a first transfer server instance was allocated to handle the transfer;
       obtain a publicly accessible address of the first transfer server instance used to communicate with the first transfer server instance based on the obtained response; and
       provide the publicly accessible address to the client computer system.

11. The system of claim 10, wherein the computer system is further programmed to:
    receive, at the allocated first transfer server instance, the target data from the client computer system at the publicly accessible address via an accelerated network protocol that is not understood by a load balancer used by the cloud service provider.

12. The system of claim 11, wherein the accelerated network protocol uses a connectionless network protocol.

13. The system of claim 12, wherein the allocation request is provided to the cloud service provider via a network protocol that is: (i) different from the connectionless network protocol, and (ii) is understood by the load balancer.

14. The system of claim 12, wherein the allocation request is provided via a Transmission Control Protocol, and wherein the target data is received at the allocated first transfer server instance via User Datagram Protocol data packets.

15. The system of claim 11, wherein the computer system is further programmed to:
  upload, by the allocated first transfer server instance, the target data to the cloud storage or download, by the allocated first transfer server instance, the target data from the cloud storage.

16. The system of claim 15, wherein to upload the target data to or download the target data from the cloud storage, the computer system is further programmed to:
  upload or download the target data from within a local network.

17. The system of claim 16, wherein to upload or download the target data to the cloud storage, the computer system is further programmed to:
  upload or download the target data via a HyperText Transfer Protocol.

18. The system of claim 10, wherein the computer system is further programmed to:
  determine whether the allocated first server instance is sufficient to transfer the target data; and
  responsive to a determination that the allocated first transfer server instance is not sufficient, request an allocation of at least a second transfer server instance to transfer the target data.

19. A computer implemented method of using accelerated transfer servers to transfer target data to or from cloud storage, the method being implemented in a computer system having one or more physical processors programmed with computer program instructions that, when executed by the one or more physical processors, cause the computer system to perform the method, the method comprising:
  obtaining, by the computer system, target data to be transferred to cloud storage or an identity of target data to be transferred from cloud storage;
  establishing, by the computer system, a communication link with a transfer server system;
  requesting, by the computer system, an allocation of one or more transfer server instances that transfer the target data to or from cloud storage;
  receiving, by the computer system, a publicly accessible address of at least a first allocated transfer server instance, wherein the allocation of the first transfer server instance is a result of load balancing in which the first transfer server instance was allocated to handle the transfer;
  establishing, by the computer system, a second communication link with the allocated first transfer server instance via the publicly accessible address, wherein the second communication link is established using an accelerated network protocol that uses a connectionless network protocol; and
  causing, by the computer system, the target data to be transferred to or from the allocated first transfer server instance via the second communication link.

20. The method of claim 19, wherein the connectionless protocol uses a User Datagram Protocol.

21. The method of claim 19, the method further comprising:
  determining, by the computer system, whether the allocated first transfer server instance is sufficient to transfer the target data; and
  responsive to a determination that the allocated first server instance is not sufficient, requesting, by the computer system, an allocation of at least a second transfer server instance to transfer the target data.

22. The method of claim 1, wherein the request to transfer target data includes identification information related to a cloud service account provided by the cloud service provider, the method further comprising:
  identifying, by the computer system, the cloud service provider based on the identification information.

23. The method of claim 1, wherein the request to transfer target data to or from the cloud storage includes identification information related to a media distribution entity, and wherein the media distribution entity is associated with a cloud service account used to store the target data in the cloud storage, the method further comprising:
  obtaining, by the computer system, an authentication credential used to access the cloud service account based on the identification information; and
  accessing, by the computer system, the cloud service account based on the authentication credential.

24. The method of claim 1, wherein a media distribution entity is associated with a cloud service account used to store the target data, and wherein the computer system stores an authentication credential used to access the cloud service account, the method further comprising:
  receiving, by the computer system, a request from the media distribution entity to provide a third party entity with an authentication token, wherein the authentication token is associated with the authentication credential; and
  providing, by the computer system, the authentication token to the third party entity to facilitate access by the third party entity to the cloud service account without the third party entity having access to the authentication credential.

25. The method of claim 24, wherein the third party entity provides the target data to be stored in the cloud storage using the cloud service account, the method further comprising:
  receiving, by the computer system, the authentication token from the third party entity;
  obtaining, by the computer system, the authentication credential used to access the cloud service account based on the received authentication token; and
  accessing, by the computer system, the cloud service account to facilitate the transfer of the target data from the third party entity to the cloud storage using the cloud service account.

26. The method of claim 1, wherein the request to transfer target data includes one or more parameters that specify the transfer of the target data, and wherein the allocation request is based on the one or more parameters.

27. The method of claim 26, wherein the one or more parameters comprise one or more of: a size of target data, a number of server instances desired, a preferred cloud service provider to use, a user credential used to transfer data to or from the cloud service provider, a domain name of a load balanced transfer server group, an object storage parameter, an object storage container, a file system path to transfer target data to or from, a credential reference that is used to associate user credential with guest account, a userid, a password, or an authentication token.

28. The method of claim 1, wherein the request to transfer target data includes first identification information that identifies the target data at the client computer system, the method further comprising:
  obtaining, by the computer system, second identification information that identifies a storage object used to store the target data in the cloud storage; and
  associating, by the computer system, the first identification information with the second identification information to create a mapping of the first identification information and the second identification information.

29. The method of claim 28, wherein the first identification information includes a filename and/or a filepath of the target data.

30. The method of claim 1, the method further comprising:
   causing, by the computer system, the first transfer server to be executed at a server of the cloud service provider; and
   causing, by the computer system, the target data to be stored at the cloud storage, wherein the server is within a firewall and the cloud is within the firewall.

* * * * *